United States Patent [19]

Tanaka et al.

[11] Patent Number: 4,811,044
[45] Date of Patent: Mar. 7, 1989

[54] SHUTTER ACTUATING DEVICE

[75] Inventors: Yoshihiro Tanaka; Sadafusa Tsuji, both of Osaka; Hiroshi Ootsuka, Sakai, all of Japan

[73] Assignee: Minolta Camera Kabushiki Kaisha, Osaka, Japan

[21] Appl. No.: 207,930

[22] Filed: Jun. 16, 1988

Related U.S. Application Data

[63] Continuation of Ser. No. 84,465, Aug. 12, 1987, abandoned.

[30] Foreign Application Priority Data

Aug. 12, 1986 [JP] Japan .................. 61-189289
Aug. 12, 1986 [JP] Japan .................. 61-189288

[51] Int. Cl.$^4$ .............................................. G03B 7/096
[52] U.S. Cl. .................. 354/457; 354/234.1; 354/271.1; 354/484
[58] Field of Search .......... 354/457, 234.1, 271.1, 354/135, 484

[56] References Cited

U.S. PATENT DOCUMENTS

| | | | |
|---|---|---|---|
| 4,119,979 | 10/1978 | Frank et al. ............ | 354/457 |
| 4,162,832 | 7/1979 | Frank et al. ............ | 354/457 |
| 4,190,336 | 2/1980 | Frank et al. ............ | 354/457 |
| 4,198,140 | 4/1980 | Frank et al. ............ | 354/457 |
| 4,234,245 | 11/1980 | Toda et al. ............ | 354/234.1 |
| 4,322,145 | 2/1982 | Yamada et al. ............ | 354/234.1 |
| 4,609,275 | 9/1986 | Ishiguro ............ | 354/435 |

FOREIGN PATENT DOCUMENTS 0031447 8/1980 Japan .
0159701 8/1985 Japan .

OTHER PUBLICATIONS

Japan Camera Trade News, May 1987, vol. 38, No. 5, New Products Section.

Primary Examiner—Russell E. Adams
Attorney, Agent, or Firm—Burns, Doane, Swecker & Mathis

[57] ABSTRACT

A shutter actuating device of the type employing a piezoelectric element as an actuating element which attains stabilization of the shutter opening speed of a shutter device. The device includes a piezoelectric element charging circuit which charges a piezoelectric element with constant current so that the rising speed of the charged voltage of the piezoelectric element may be maintained constant. Means is also disclosed for minimizing a time lag until a minimum aperture for exposure is reached after triggering of a shutter release operation. Higher constant charging current is supplied to the piezoelectric element until a time just before the minimum aperture for exposure is presented, and after then the piezoelectric element is charged with lower constant current.

11 Claims, 6 Drawing Sheets

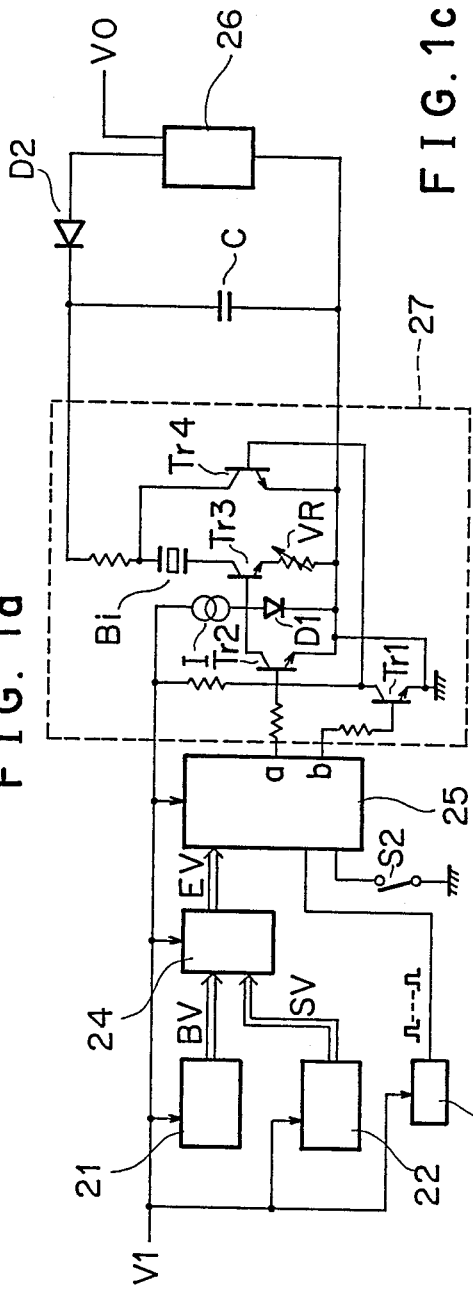
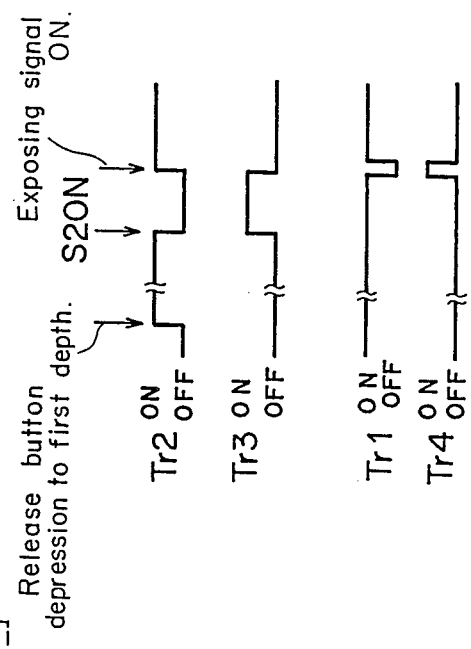
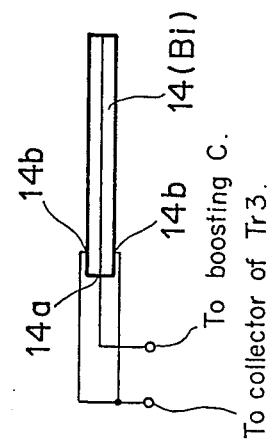

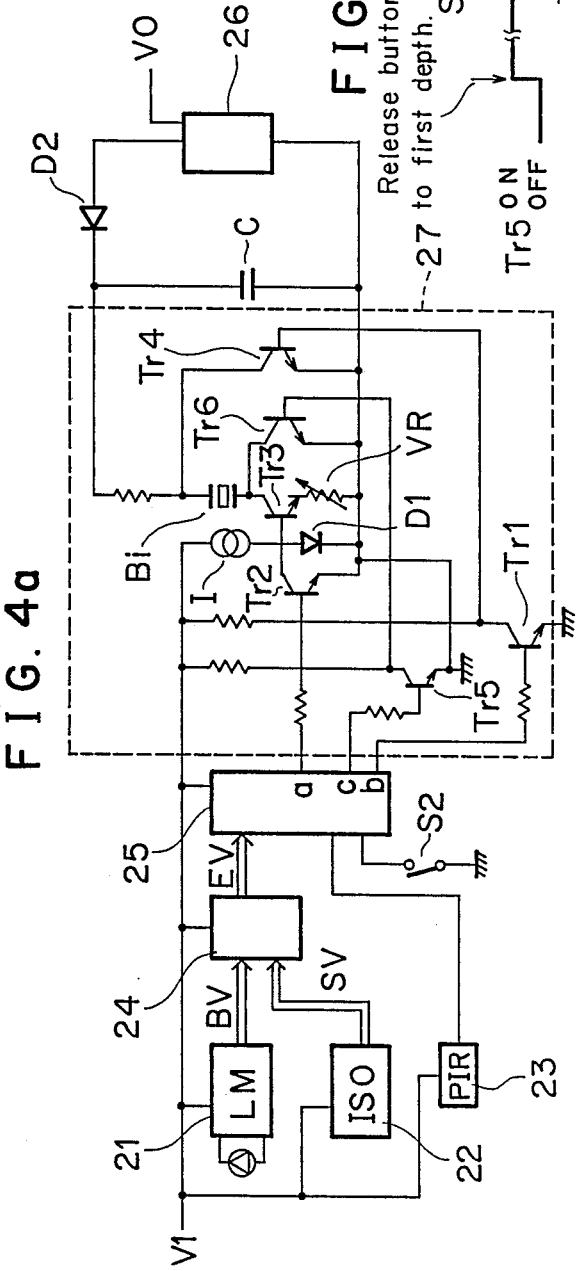

To collector of Tr5.
To collector of Tr1.

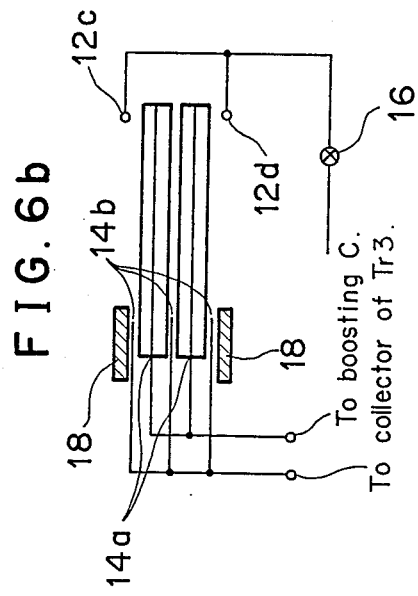

SHUTTER ACTUATING DEVICE

This application is a continuation of application Ser. No. 084,465 filed Aug. 12, 1987 now abandoned.

BACKGROUND OF THE INVENTION

1. Field of the Invention

This invention relates to an actuating device for a shutter of the type which employs a piezoelectric element as an actuating element.

2. Description of the Prior Art

A shutter actuating device is required to be accurate in exposing operation. In particular, a shutter actuating device is required that it be accurate in aperture and also accurate in time until a predetermined aperture position is reached. Where a shutter is actuated using, as an actuating element, a piezoelectric element such as a bimorph element which produces an actuating force when a voltage is applied thereacross, a required aperture accuracy can be readily realized if a photocoupler or a like element is used. However, the accuracy in time until a predetermined aperture position is reached depends upon the stability of the charging speed of the bimorph element when a voltage is applied across the bimorph element because the actuating force produced by the bimorph element increases in proportion to the voltage applied which in turn increases in proportion to the charge accumulated in the bimorph element and accordingly the bimorph element can be regarded as a capacitor. Conventional methods involve supply of shaped pulse current to charge up a bimorph element as disclosed in Japanese Patent Laid-Open No. 60-149033. However, such methods necessitate a pulse generator. Consequently, there is a problem that the system is complicated in construction and accordingly is high in cost.

SUMMARY OF THE INVENTION

It is an object of the present invention to provide a shutter actuating device of the type employing a piezoelectric element as an actuating element which attains stabilization of the shutter opening speed of a shutter device.

In order to attain the object, the reproducibility of the speed at which a piezoelectric element such as a bimorph element employed as an actuating element in a shutter actuating device is charged must be improved so as to improve the accuracy in time until a predetermined aperture position of the shutter is reached because the actuating force of the piezoelectric element increases in proportion to a charged voltage of the piezoelectric element. To this end, according to the present invention, a shutter actuating device includes a piezoelectric element charging circuit which charges a piezoelectric element with constant current. Thus, since the current for charging the piezoelectric element is maintained constant, the rising speed of the charged voltage of the piezoelectric element is maintained constant. Consequently, the shutter speed is stabilized and the accuracy in time is improved.

Thus, according to one aspect of the present invention, there is provided a shutter actuating device which comprises a power source, a boosting circuit for boosting a voltage of the power source, a charging capacitor for accumulating therein a charge of electric energy boosted by the boosting circuit, a shutter mechanism, a piezoelectric element for actuating the shutter mechanism, a first piezoelectric element driving means for charging the piezoelectric element with constant current by the electric energy accumulated in the charging capacitor so as to deform the piezoelectric element to operate the shutter mechanism to open the shutter, a second piezoelectric element driving means for deforming the piezoelectric element in the opposite direction to close the shutter, and an exposure controlling means for controllng the first piezoelectric element driving means to supply constant current to the piezoelectric element until an appropriate exposure amount is reached in accordance with a brightness of an object and a sensitivity of a film used and for controlling the second piezoelectric element driving means to deform the piezoelectric element in the opposite direction after the appropriate exposure amount has been reached.

According to another aspect of the present invention, there is provided a shutter actuating device which comprises a power source, a boosting circuit for boosting a voltage of the power source, a charging capacitor for accumulating therein a charge of electric energy boosted by the boosting circuit, a shutter mechanism, a piezoelectric element for actuating the shutter mechanism, a first piezoelectric element driving means for charging the piezoelectric element by the electric energy accumulated in the charging capacitor so as to deform the piezoelectric element to operate the shutter mechansism to open the shutter, a second piezoelectric element driving means for deforming the piezoelectric element in the opposite direction to close the shutter, a manually operable means manually operable to trigger an exposing operation, a timing controlling means operable in response to operation of the manually operable means for controlling the first piezoelectric element driving means to supply first current to the piezoelectric element for a predetermined period of time before an exposing operation actually begins and then to supply, after lapse of the predetermined period of time, second current lower than the first current to the piezoelectric element, and an exposure controlling means for controlling the first piezoelectric element driving means to supply current to the piezoelectric element until an appropriate exposure amount is reached in accordance with a brightness of an object and a sensitivity of a film used and for controlling the second piezoelectric element driving means to deform the piezoelectric element in the opposite direction after the appropriate exposure amount has been reached.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1a is a circuit diagram of an electric circuit of a shutter actuating device showing an embodiment of the present invention;

FIG. 1b is a wiring diagram of a bimorph element in the circuit of FIG. 1a;

FIG. 1c is a time chart illustrating operation of the circuit of FIG. 1a;

FIG. 2b is a sectional view taken along line IIb—IIb of FIG. 2a;

FIG. 4a is a circuit diagram of an electric circuit of a shutter actuating device showing another embodiment of the present invention;

FIG. 4b is a time chart illustrating operation of the circuit of FIG. 4a;

FIGS. 5a and 5b are circuit diagrams showing different modifications to the circuit of FIG. 4a;

FIG. 6a is a circuit diagram of an electric circuit of a shutter actuating device showing a further embodiment of the present invention; and FIG. 6b is a wiring diagram of a bimorph element in the circuit of FIG. 6a.

DETAILED DESCRIPTION OF THE PREFERRED EMBODIMENTS

Figure 2A:
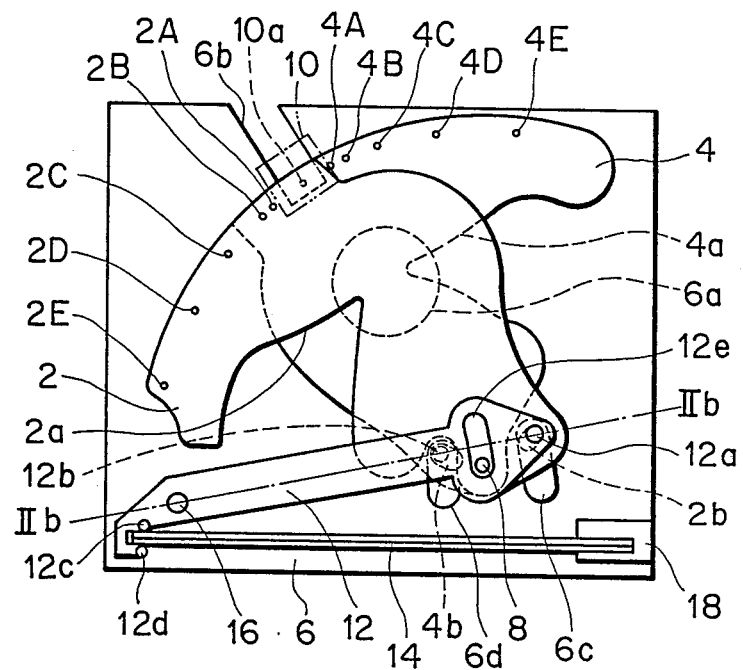
FIG. 2a is a schematic front elevational view showing a shutter mechanism in which the shutter actuating device of the present invention is incorporated.
Figure 2B:
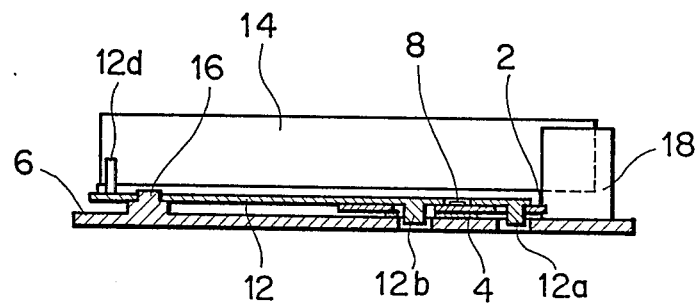

Referring first to FIGS. 2a and 2b, there is shown a shutter mechanism of a camera or the like in which a shutter actuating device according to the present invention is incorporated. The shutter mechanism is of the type wherein a shutter acts also as an aperture diaphragm and is thus opened at a uniform speed until an aperture value which is determined by a brightness of an object is reached. In general construction, the shutter mechanism shown includes a pair of shutter blades 2, 4 which each has a plurality of shutter aperture detecting small holes formed therein and are pivoted simultaneously in opposite directions by an actuating force produced by a bimorph element 14 in the form of a cantilever, and during such pivotal motion of the shutter blades 2, 4, an optical detecting element 10 located behind the shutter blades 2, 4 detects coincidence or registration of the shutter aperture detecting small holes with each other until it is determined from the number of occurrences of optical detection by the optical detecting element 10 that a designated opening position of the shutter is reached: when a predetermined value is reached by the number of occurrences of such optical detection, it is determined that the designated opening is reached by the shutter opening. Then, the opening movement of the shutter blades is stopped and the shutter blades 2, 4 are subsequently returned to their respective initial positions.

In particular, the shutter blades 2 and 4 are mounted for pivotal motion around a common shaft 8 secured to a shutter base plate 6 and have substantially symmetrical geometrical constructions with respect to a line interconnecting the center of an exposure aperture 6a formed in the shutter base plate 6 and the center of the shaft 8. The shutter blades 2, 4 have elongated holes 2b, 4b formed therein, respectively, which are engaged respectively by engaging pins 12a, 12b provided on an opening and closing lever 12 so that the shutter blades 2, 4 are pivoted by the engaging pins 12a, 12b, respectively, when the opening and closing lever 12 is moved. The shutter blades 2, 4 further have V-shaped cutaway openings 2a, 4a formed therein, respectively, so that as the shutter blades 2, 4 are pivoted in clockwise and counterclockwise directions, respectively, in FIG. 2a around the common shaft 8, the V-shaped cutaway openings 2a, 4a will open the exposure aperture 6a of the shutter base plate 6.

The shutter blades 2 and 4 further have a plurality of small holes 2A, 2B, 2C, 2D and 2E, and 4A, 4B, 4C, 4D and 4E formed therein, respectively. The small holes 2A to 2E and 4A to 4E are located on a same circumferential line around the common shaft 8 and in a symmetrical relationship with respect to the line interconnecting the center of the exposure aperture 6a and the center of the shaft 8 such that as the small holes move on the circumferential line when the shutter blades 2 and 4 are pivoted, the small holes 2A and 4A will overlap each other, at a measuring position 10a of the optical detecting element 10 which is located in a recess 6b of the shutter base plate 6, just before the blades 2, 4 begin to present an aperture; the small holes 2B and 4B will overlap at a point of time when the blades 2, 4 are opened until a minimum aperture for exposure is presented; the small holes 2E and 4E will overlap at a point of time when the blades 2, 4 are opened until a maximum aperture for exposure is reached; and the remaining small holes 2C and 4C, 2D and 4D will overlap at points of time when the blades 2, 4 are opened to predetermined apertures for exposure intermediate the minimum and maximum apertures for exposure. It is to be noted that such small holes may be provided in a suitable quantity at suitable positions in accordance with aperture values to be detected.

In addition to the exposure aperture 6a and the recess 6b in which the optical detecting element 10 is located, the shutter base plate 6 has formed therein a pair of elongated holes 6c, 6d which allow the pins 12a, 12b on the shutter opening and closing lever 12 to extend therethrough and thus prevent the shutter base plate 6 from interfering with the opening and closing lever 12. The shutter opening and closing lever 12 is supported for pivotal motion around a shaft 16 provided on the shutter base plate 6 and has an elongated hole 12e formed at a right end portion thereof in FIG. 2. The shaft 8 extends through the elongated hole 12e so that it may not interfere with movement of the shutter opening and closing lever 12. The shutter engaging pins 12a, 12b are located near the right end of the opening and closing lever 12 in a substantially symmetrical relationship with respect to the elongated hole 12e while a pair of pins 12c, 12d are provided at a left end portion of the opening and closing lever 12 in FIG. 2. A left end portion of the bimorph element 14 is received closely but movably between the pins 12c, 12d while the other end portion of the bimorph element 14 is secured to a retaining plate 18 which is in turn secured to the shutter base plate 6.

In a closed position of the shutter as seen in FIG. 2, if a voltage is applied across the bimorph element 14, the bimorph element 14 is curved or displaced in a clockwise direction around the fixed right end thereof on the retaining plate 18, thereby exerting an actuating force. This actuating force will pivot the opening and closing lever 12 in the clockwise direction around the shaft 16 so that the shutter blades 2, 4 will be pushed at the elongated holes 2b, 4b thereof by the pins 12a and 12b, respectively, on the opening and closing lever 12 and consequently are pivoted in a mutually opening direction to open the exposure aperture 6a of the shutter base plate 6.

As the shutter blades 2, 4 are pivoted in this manner, the small holes 2A and 4A, 2B and 4B, 2C and 4C, 2D and 4D, and 2E and 4E are successively overlapped or registered with each other. The optical detecting element 10 detects such overlapping of the small holes at the measuring position 10a and delivers a signal each time it detects such overlapping. When a predetermined number or quantity of such detection signals are received from the optical detecting element 10, an exposure controlling circuit which will be hereinafter described determines that a designated shutter aperture is reached and thus stops application of the voltage across the bimorph element 14 so as to stop the opening movement of the shutter blades 2, 4. Consequently, the shutter blades 2, 4 are returned to the respective initial positions as shown in FIG. 2a.

Referring now to FIG. 1a, an electric circuit for controlling the shutter mechanism is shown. The circuit shown includes as a principal component a bimorph charging circuit 27 wherein a bimorph element Bi which may be the bimorph element 14 of the shutter mechanism of FIGS. 2a and 2b is interposed in a collector circuit of a transistor Tr3 so that it may be charged with constant current making use of the amplifying characteristic or a transistor that, so far as the base current is constant, or in other words, so far as the base-emitter voltage is constant, the collector current is substantially constant independently of a collector voltage.

The circuit of FIG. 1a further includes a light measuring circuit 21 for measuring a brightness value (luminance value Bv) of an object, a film sensitivity reading circuit 22 for reading a film sensitivity value (speed value Sv) on a film magazine loaded in the camera, and an aperture position detecting circuit 23 in which the optical detecting element 10 of FIG. 2 is incorporated in circuit. The controlling circuit further includes an operating circuit 24 which calculates an exposure value Ev from a brightness value (luminance value Bv) received from the light measuring circuit 21 and a film sensitivity value (speed value Sv) received from the film sensitivity reading circuit 22 and delivers the calculated exposure value Ev to an exposure controlling circuit 25. The exposure controlling circuit 25 is connected to a switch S2 which is closed by a shutter releasing operation, and upon closing of the switch S2, the exposure controlling circuit 25 delivers a charging signal for the bimorph element Bi to the bimorph charging circuit 27. Then, when pulse signals delivered from the aperture position detecting circuit 23 to the exposure controlling circuit 25 reach a quantity corresponding to the exposure value Ev, the exposure controlling circuit 25 stops its delivery of the charging signal and now delivers a signal to cause the bimorph element Bi to discharge its accumulated charge. Meanwhile, the bimorph charging circuit 27 operates in response to a controlling signal, that is, a charging signal or a discharging signal, from the exposure controlling circuit 25 to charge the bimorph element Bi with constant current or to discharge the accumulated charge almost instantaneously from the bimorph element Bi. A boosting circuit 26 is connected to the bimorph charging circuit 27 and a power source and boosts a voltage of the power source to a maximum voltage necessary to charge up the bimorph element Bi. The boosting circuit 26 may be common to an electronic flash device of the camera.

As illustratively shown in FIG. 1b, the bimorph element 14 (Bi) has a central electrode 14a connected to the boosting circuit 26 and opposite side electrodes 14b connected to the collector of the transistor Tr3 and is curved or displaced in the clockwise direction in FIG. 2a around the fixed end thereof on the retaining plate 18 side when a positive voltage is applied across the central electrode 14a and the opposite side electrodes 14b of the bimorph element 14 (Bi).

With the circuit construction described above, if a main switch not shown is enabled, a voltage Vo is supplied from the power source to the boosting circuit 26 of the electronic flash device so that a main capacitor C connected via a diode D2 to the boosting circuit 26 will be charged up to a predetermined voltage by the boosting circuit 26. When a shutter release button not shown is subsequently depressed to a first position or depth, a switch not shown is enabled so that a voltage V1 is supplied to the circuits of the controlling circuit other than the boosting circuit 26. Consequently, the light measuring circuit 21 is rendered operative and thus delivers a brightness of an object as a Bv value to the operating circuit 24. Meanwhile, the film sensitivity reading circuit 22 reads a sensitivity of a film from a code pattern such as CAS (Camera Auto Sensing) Code on a film magazine and delivers it as an Sv value to the operating circuit 24. The operating circuit 24 thus calculates an exposure value Ev from the received Bv value and Sv value and delivers the calculated exposure value Ev to the exposure controlling circuit 25. At this stage, the exposure controlling circuit 25 outputs high level signals from output terminals a and b thereof so that transistors Tr1, Tr2 are both on as seen in FIG. 1c. Accordingly, the transistor Tr3 for driving the bimorph element Bi and another transistor Tr4 for initializing the bimorph element Bi are both in an off state. Consequently, the bimorph element Bi is not charged by the electric energy accumulated in the main capacitor C, and accordingly the charged voltage of the bimorph element Bi is zero.

Then, when the release button is depressed further to a second position or greater depth in order to effect photographing, the release switch S2 is closed. In response to this signal, the exposure controlling circuit 25 now delivers a zero level from the output terminal a thereof while it continues to deliver a high level signal from the terminal b thereof so that the transistor Tr2 of the bimorph charging circuit 27 is turned off and the transistor Tr3 is turned on as seen in FIG. 1c. Consequently, the bimorph element Bi begins to be charged by the electric energy accumulated in the main capacitor C. In order that the constant current $I_1$ may flow through the transistor Tr3 and hence through the bimorph element Bi, a diode D1 is connected between the base and the emitter of the transistor Tr3 and is connected to a constant-current source I so that constant current may flow through the diode D1. Accordingly, the base-emitter voltage of the transistor Tr3 is maintained constant, and consequently the collector curretn $I_1$ of the transistor Tr3 is maintained constant. A variable resistor VR for adjusting the level of the constant current $I_1$ is connected between the collector of the transistor Tr3 and a terminal of the diode D1 remote from the constant-current source I. The variable resistor VR is provided so as to adjust the charging current to the bimorph element Bi for correcting an exposure error of the camera which may arise from possible dispersion of characteristics of the bimorph element Bi and the shutter mechanism actuated by the bimorph element Bi from those of a standard bimorph element and a standard shutter mechanism actuated by the standard bimorph element, respectively. As the bimorph element Bi is charged with the constant current $I_1$ as described hereinabove, an actuating force is produced in the bimorph element Bi and increases in proportion to the charged voltage of the bimorph element Bi. The shutter is opened by the actuating force as described hereinabove. As the shutter is opened, pulses are delivered successively from the aperture position detecting circuit 23 to the exposure controlling circuit 25. Then, when the quantity of pulses corresponding to the calculated exposure value Ev are received, the exposure controlling circuit 25 delivers a high level signal from the output terminal a thereof and a zero level signal from the output terminal b thereof so as to turn the transistor Tr2 on and the transistor Tr3 off as seen in FIG. 1c to stop the opening movement of the shutter while turning off the transistor Tr1 for controlling closing of the shutter and turning and keeping the transistor Tr4 on for a short period of time so as to short-circuit the bimorph element Bi. As a result of such short-circuiting, the bimorph element Bi quickly returns itself to its initial position to close the shutter.

Figure 3:
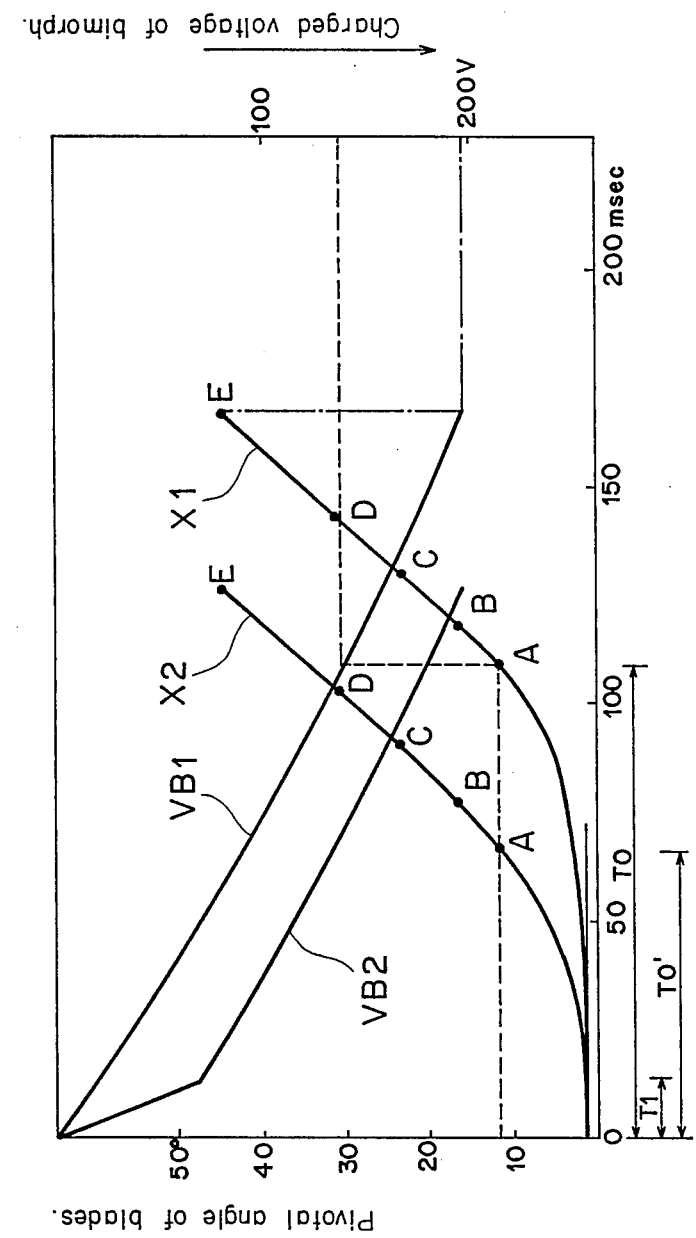
FIG. 3 is a time chart illustrating operation of the bimorph element.

Although exposure control is effected by controlling the shutter using the bimorph Bi as described hereinabove, the change in aperture amount of the shutter in which the bimorph Bi is used does not present a significant change with respect to a charged voltage at a first stage of such charging. It is considered that this is because an actuating force which overcomes a force of static friction of the shutter mechanism is not produced in the bimorph element Bi until the bimorph element Bi is charged up to a voltage higher than a predetermined level. This condition is illustrated in FIG. 3. Referring to FIG. 3, graduations on the left side axis of ordinates represent a pivoted angle (or amount of displacement) of the shutter blades and graduations on the right side axis of ordinates represent a charged voltage of the bimorph element while the axis of abscissa represents a controllng time for the shutter blades. Meanwhile, curves X1, VB1 indicate a pivoted angle of the shutter blades and a charged voltage required to reach the pivoted angle, respectively, in the case of the embodiment described above. Meanwhile, points A, ..., and E on the curve X1 of the pivoted angle characteristic of the shutter blades correspond to the small holes 2A to 2E and 4A to 4E, respectively, formed in the shutter blades 2, 4 shown in FIG. 2. It is to be noted that since in FIG. 3 the charged voltage is represented by a voltage at the collector of the transistor Tr3 in FIG. 1, the actual charged voltage of the bimorph element Bi is obtained by subtracting the collector voltage of Tr3 from the output voltage of the boosting circuit 26, and in FIG. 3, the charged voltage increases in the downward direction.

Now, if the pivotal angular position of the shutter blades directly before the shutter blades present an aperture is represented A, a time To is taken for the displacement by the pivotal angle from the initial position of the shutter blades.

Since it is considered that the time To has no influence on exposure, this is only a release time lag after triggering of the releasing operation (S2ON) and accordingly is a waste time. If it is intended to compensate for this, that is, to reduce or minimize the waste time, electric current for charging the bimorph element should be increased, but the value of the current is actually determined uniquely as an opening speed of the shutter (shutter speed) by the shutter blades (including their actuating mechanism) and cannot be changed freely.

Therefore, in an embodiment described subsequently, the charging current is increased for a predetermined period of time T1 at an initial stage of charging so as to effect boosting charge in order to minimize the waste time. Results of this are indicated as curves X2, YB2 in FIG. 3 which similarly represent a pivoted angle of the shutter blades and a charged voltage required for actuation of the shutter blades, respectively.

As apparently seen from FIG. 3, the time taken from starting of a releasing operation to a time just before the blades present an aperture is shortened from To to To'.

Construction of a circuit for realizing this and a time chart are shown in FIGS. 4a and 4b, respectively. In the circuit shown in FIG. 4a, like components or elements are denoted like reference symbols to those of FIG. 1a, and overlapping description thereof is omitted herein. This also applies to modifications and a further embodiment which will be hereinafter described. Comparing with the circuit of FIG. 1a, the circuit of FIG. 4a additionally includes a transistor Tr6 connected in parallel to a transistor Tr3 and a transistor Tr5 for controlling the transistor Tr6. Meanwhile, an exposure controlling circuit 25 has an output terminal c in addition to output terminals a, b. Time schedules of output signals of the output terminals a, b are similar to those of the preceding embodiment. On the other hand, the terminal c of the exposure controlling circuit 25 normally presents a high level, but when a releasing operation (S2ON) is triggered, the terminal c delivers a signal of a zero level for a predetermined period of time T1 so as to control the transistor Tr5 to turn and keep the transistor Tr6 on.

As a modification, the boosting charging of the bimorph element may not necessarily be continued for the predetermined period of time T1 but for another predetermined or variable period of time until just before the blades present an aperture. In the latter case, the exposure controlling circuit 25 may maintain the output signal at the ouput terminal c thereof to the zero level for a period of time from S2ON to a point of time when a signal produced upon detection of overlapping of the small holes 2A and 4A is received from the aperture position detecting circuit 23.

Figure 5A:
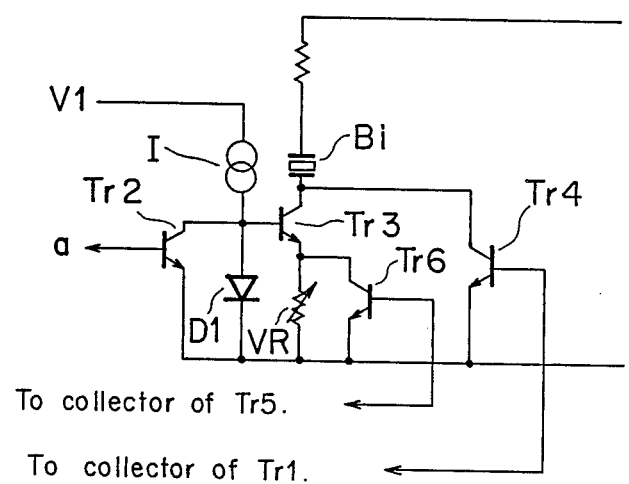
Figure 5B:
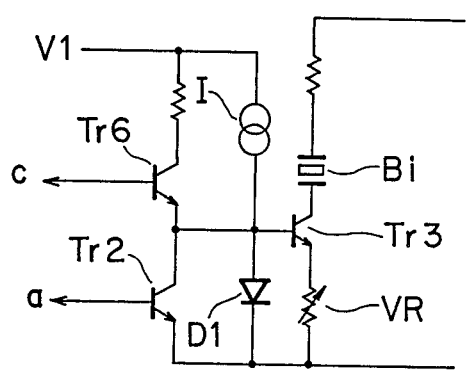

In order to increase the charging current for the bimorph element only for such a period of time T1 after triggering of a releasing operation, that is, S2ON, the circuit shown in FIG. 4a may be modified in various forms. Two exemplary modifications are shown in FIGS. 5a and 5b. In the charging circuit shown in FIG. 5a, a transistor Tr6 is connected in parallel with a resistor VR. On the other hand, in the charging circuit shown in FIG. 5b, a transistor Tr6 is connected in parallel with a constant-current source I so that the base current of a transistor Tr3 may be increased while the transistor Tr6 is on. In those modifications, output terminals a, c of an exposure controlling circuit 25 may both be changed from a high level to a zero level in response to turning on of the release switch S2ON, and then after lapse of the predetermined period of time T1, only the output terminal c may be returned to the high level. Further, the circuit may be composed such that the electric current for charging the bimorph element B1 alternatively flows through the charging circuit consisting of the transistor Tr3 and the resistor VR or another charging circuit having a higher current value. For example, in FIGS. 4a and 5a, while the output terminal a of the exposure controlling circuit 25 is maintained to the high level, the output terminal c is changed from the high level to the zero level in response to turning on of the release switch S2ON, and then at a point of time after lapse of the predetermined period of time T1 the output terminal a is changed to the zero level while the output terminal is returned to the high level. Thus, in the case, the transistor Tr6 constitutes the above mentioned charging circuit which flows high current through the bimorph element.

Generally, the magnitude of a force F of a bimorph element increases in proportion to the width w of the bimorph element. For example, in order to double the magnitude of a force F of a bimorph element, the width w of the bimorph element may be doubled. However, where use of a bimorph element in a camera is considered, the volume of a range within which the bimorph element moves is required as a space. Accordingly, use of the double-width bimorph element is not suited for miniaturization of a camera. FIG. 6a shows a shutter actuating device wherein the magnitude of a force of a bimorph element can be doubled without substantially increasing a space necessary for actuation of the bimoprh element.

The shutter actuating device shown in FIG. 6a includes two bimorph elements Bi in order to obtain a force of a doubled magnitude. The two bimorph elements Bi are disposed one on the other as illustratively shown in FIG. 6b so that the space for the bimorph elements Bi does not present a substantial increase relative to that where a single bimorph is used because each space for the movement of the bimorph element overlaps with each other. Thus, the bimorph elements Bi are curved or displaced in the same direction when a positive voltage is applied across the central electrodes thereof connected to a boosting circuit and the opposite side electrodes connected to the collector of a transistor Tr3.

Although this arrangement may seem equivalent to a single bimorph element having a twice thickness, they are actually different from each other. A bimorph element has characteristics represented by $$\text{displacement } \delta \approx 3 \times d_{31} \times V \times (l/2t)^2 \quad (1)$$

$$\text{Force } F \approx \frac{3}{4} \times d_{31} \times V \times \frac{2tw}{l} \times Y_{31} \quad (2)$$

where $d_{31}$, $Y_{31}$ are constants, V is a voltage applied to, l a length, w a width and t a thickness of the bimorph element. Now, if there is a difference only in thickness, the expressions (1), (2) are rewritten as $$\delta \not\equiv V/t^2 \quad (1)'$$

$$F \alpha V \times t \quad (2)'$$

Now, if only a force to be produced is considered, a doubled thickness will result in a doubled force. To the contrary, the amount of displacement increases in proportion to $1/t_2$, and accordingly a doubled thickness will result in ¼ of an original amount of displacement. Consequently, an intended amount of displacement cannot be obtained.

Where two bimorph elements are arranged in an overlapping relationship, it is desirable that there be no friction between them, and by spacing two bimorph elements by a very little distance from each other, possible interference between the two opposing bimorph elements may be eliminated. Further, lubricant such as oil, grease or fluorine-contained polymers such as Teflon may preferably be filled between two bimorph elements.

It is to be noted that while in the embodiments and modifications described above a bimorph element is used to control a shutter, it is a matter of course that a bimorph element can also be used to control actuation of a lens of a camera.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A shutter actuating device, comprising:
   a power source;
   a boosting circuit for boosting a voltage of said power source;
   a charging capacitor for accumulating therein a charge of electric energy boosted by said boosting circuit;
   a shutter mechanism;
   a piezoelectric element for actuating said shutter mechanism;
   a first piezoelectric element driving means for charging said piezoelectric element with constant current by the electric energy accumulated in said charging capacitor so as to deform said piezoelectric element to operate said shutter mechanism to open the shutter;
   a second piezoelectric element driving means for deforming said piezoelectric element in the opposite direction to close the shutter; and
   an exposure controlling means for controlling said first piezoelectric element driving means to supply constant current to said piezoelectric element until an appropriate exposure amount is reached in accordance with a brightness of an object and a sensitivity of a film used and for controlling said second piezoelectric element driving means to deform said piezoelectric element in the opposite direction after the appropriate exposure amount has been reached.

2. A shutter actuating device as claimed in claim 1, wherein said first piezoelectric element driving means includes means for adjusting the constant current to a desired level.

3. A shutter actuating device as claimed in claim 2, wherein said first piezoelectric element driving means includes a circuit which is connected in parallel with said charging capacitor and includes the constant current circuit and a variable resistor connected in series to said piezoelectric element, said means for adjusting being constituted from said output stage of the constant current and said variable resistor.

4. A shutter actuating device as claimed in claim 3, wherein an output stage of the constant current circuit includes a transistor, said variable resistor being connected to the emitter of said transistor.

5. A shutter actuating device as claimed in claim 4, wherein said second piezoelectric element driving means acts to short-circuit said piezoelectric element.

6. A shutter actuating device as claimed in claim 5, wherein said exposure controlling means includes means for delivering a shutter position signal pulse corresponding to an aperture amount of the shutter, means for counting such pulses, and means for calculating a quantity of pulses indicative of an aperture amount by which an appropriate exposure amount can be attained in accordance with a brightness of an object and a film sensitivity, for comparing, after starting of an exposing operation, the calculated pulse quantity and the counted pulse quantity with each other, and for operating said second piezoelectric driving means when the calculated pulse quantity and the counted pulse quantity coincide with each other.

7. A shutter actuating device as claimed in claim 6, wherein said boosting circuit is a boosting circuit which is provided for driving a flash device, and said charging capacitor is a capacitor which is provided for driving said flash device.

8. A shutter actuating device, comprising:
a power source;
a boosting circuit for boosting a voltage of said power source;
a charging capacitor for accumulating therein a charge of electric energy boosted by said boosting circuit;
a shutter mechanism;
a piezoelectric element for actuating said shutter mechansism;
a first piezoelectric element driving means for charging said piezoelectric element by the electric energy accumulated in said charging capacitor so as to deform said piezoelectric element to operate said shutter mechanism to open the shutter;
a second piezoelectric element driving means for deforming said piezoelectric element in the opposite direction to close the shutter;
a manually operable means manually operable to trigger an exposing operation;
a timing controlling means operable in response to operation of said manually operable means for controlling said first piezoelectric element driving means to supply first current to said piezoelectric element for a predetermined period of time before an exposing operation actually begins and then to supply, after lapse of the predetermined period of time, second current lower than said first current to said piezoelectric element; and
an exposure controlling means for controlling said first piezoelectric element driving means to supply current to said piezoelectric element until an appropriate exposure amount is reached in accordance with a brightness of an object and a sensitivity of a film used and for controlling said second piezoelectric element driving means to deform said piezoelectric element in the opposite direction after the appropriate exposure amount has been reached.

9. A shutter actuating device as claimed in claim 8, wherein said first piezoelectric element driving means includes a first charging means for supplying constant current to said piezoelectric element, and a second charging means connected in parallel with said first charging means, said timing controlling means causing both of said first and second charging means to be driven in response to operation of said manually operable means whereafter said timing controlling means causes only said second charging means to be stopped after lapse of the predetermined period of time.

10. A shutter actuating device as claimed in claim 8, wherein said first piezoelectric element driving means includes a charging means for supplying constant current to said piezoelectric element, a current controlling means connected to a current path of said charging means, and a bypass means connected in parallel with said current controlling means, said timing controlling means causing both of said charing means and said bypass means to be driven in response to operation of said manually operable means whereafter said timing controlling means causes only said bypass means to be stopped after lapse of the predetermined period of time.

11. A shutter actuating device as claimed in claim 10, wherein said current controlling means includes a variable resistor.

* * * * *